Patented Mar. 9, 1948

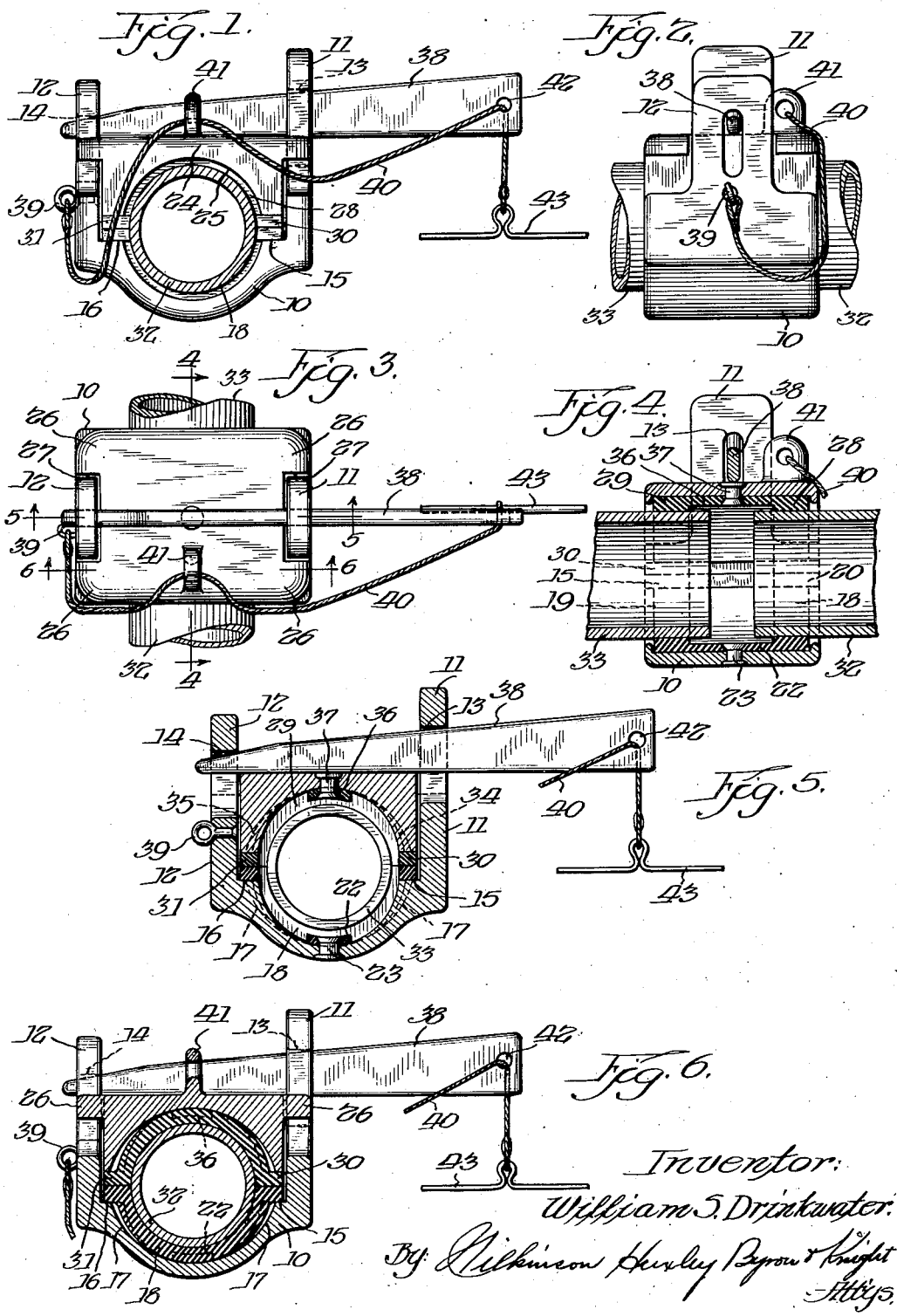

2,437,246

UNITED STATES PATENT OFFICE 2,437,246

FLEXIBLE PIPE COUPLING

William S. Drinkwater, Chicago, Ill., assignor, by mesne assignments, to Drinkwater, Inc., Waukegan, Ill., a corporation of Illinois Application February 14, 1945, Serial No. 577,797

7 Claims. (Cl. 285—194)

My invention relates to a pipe coupling and has particular reference to a device for coupling together the free ends of pipe used for conveying fluid from one locality to another.

Another object of my invention is the provision of a pipe coupling device consisting of a plurality of elements which are connected together in such manner that when the device is to be assembled and applied to the ends of pipe the operator is certain to have all of the parts necessary, and which can be easily and quickly applied to pipe, insuring a non-leakable connection between the pipes.

Another and further object of my invention is the provision of a pipe coupling which can be easily and quickly assembled around the ends of adjacent sections of pipe and put in position in the field without the use of tools, and in which the operator can take a number of the devices and carry or drag them to the points indicated and quickly apply them to pipes, assuming that the pipes have been previously laid or in operations where the pipes are being assembled and connections made quickly without the use of tools of any kind or through the use of any convenient piece of wood or the like which may be used for driving the key into position.

Another and further object of my invention is the provision of a pipe coupling which is flexible in its use and by means of which pipes can be connected together when laid at a slight angle to each other without leaking and in which quick application of the device can be made to pipes to insure a continuous conduit where needed for the transporting of oil, water or the like.

Another and further object of my invention is the provision of a coupling in which an elastic sealing member is fixed to the units in such manner that in the applying of the device to pipe and making a coupling a seal is formed which may conform to slight irregularities in the material of which the pipe is composed and yet provide a liquid-proof seal for connecting the pipes together, particularly for hurried and quick, as well as temporary, operations, or if desired, once in position the device would serve its purpose for an indeterminate length of time.

These and other objects of my invention will be more fully and better understood by reference to the accompanying drawings, and in which—

Figure 1 is an end elevational view of my improved pipe coupling with a pipe shown in section;

Figure 2 is a side elevational view of the device shown in Fig. 1;

Figure 3 is a top plan view of the device;

Figure 4 is a transverse sectional view on lines 4—4 of Fig. 3;

Figure 5 is a transverse sectional view on lines 5—5 of Fig. 3; and

Figure 6 is a transverse sectional view taken on lines 6—6 of Fig. 3.

Referring now particularly to the drawings, and in which like reference characters refer to like parts throughout, a lower segmental member 10 is shown having ears 11 and 12 integrally formed therewith and extending upwardly therefrom, the ears 11 and 12 having slots 13 and 14 therein for purposes hereinafter described. The member 10 has an arcuate central portion with longitudinally extending shoulders 15 and 16 formed thereon and has a plurality of arcuate shaped channels 17 at each end thereof within which arcuate portions 18 and 19 of a sealing member are adapted to fit, with flanges 20 and 21 being provided which connect the arcuate portions 18 and 19 at each of their ends and extend outward therefrom and rest upon the shoulder portions 15 and 16 of the member 10. These channels 17 are deepest adjacent the shoulders 15 and 16 and taper out at the bottom of the member 10. A web 22 connects the arcuate portions 18 and 19 at their central portions with a rivet 23 being provided which extends through the web 22 and the member 10, thereby holding the entire sealing member loosely in position within the segmental member 10.

An upper segmental member 24 is provided having an arcuate surface 25 therein with ears 26, 26 formed at each of the four corners thereof with channels 27 formed by these ear portions within which the ears 11 and 12 formed upon the lower segmental member 10 extend with a sealing member fixed therein comprising arcuate portions 28 and 29 which are connected by flanges 30 and 31 which are fitted in face to face relation with the flanges 20 and 21, thereby forming a seal at each side of these members and alongside the ends of the pipe sections when the device is clamped firmly around the pipe sections 32 and 33. Recesses 34 and 35 are formed in the segmental member 24, these recesses tapering out towards the center of the arcuate surface of the member 24. A web 36 is provided which connects the arcuate portions 28 and 29 of the sealing member with a rivet 37 extending therethrough, which normally holds the sealing member in loose position in the upper segmental member 24 in position to be quickly affixed around the ends of adjacent pipe sections 32 and 33 as shown particularly in Fig. 4. A key 38 is provided, which, when the device is in assembled relation, is inserted through the slots 13 and 14, extends across the top face of the upper segmental member 24 and normally holds the elements of the coupling member in assembled relation around the adjacent ends of the pipe sections and exerts sufficient pressure thereon to seal the coupling around the ends of the pipes to prevent leakage of fluid therefrom.

At one side of the segmental member 10 is an eyelet 39 to which a cable 40 is secured which is threaded through an eyelet 41 formed on the top of the upper segmental member 24 and through a hole 42 with a member 43 secured to the outer end of the cable which forms a convenient means for an operator to grasp the cable and which in effect insures that all of the elements forming the combination necessary to secure the pipe together are on a unit and that both for shipping purposes and for purposes of use in the field, insures that the operator has all of the parts necessary to make a quick coupling and that none of the parts will be lost or misplaced. When the parts are in dissembled relation they are in effect all carried upon the cable 40, and an operator can, by grasping the handle 43, carry several of these couplings or can drag them along the ground while engaged in coupling together the pipe sections or they can be rapidly distributed to the designated places and quickly and easily applied to the pipe sections. It will be understood, of course, that any flexible member such as a chain can be substituted for the cable 40 as shown and perform the same function.

The operation and use of the device will be more quickly and readily understood by those skilled in the art in that when it is desired to connect the adjacent ends of pipes or pipe sections the coupling, which for purposes of illustration will be assumed to be in dissembled relation, is placed around the ends of the pipes particularly as shown in Fig. 4 by placing the lower segmental member on the underside of each of the pipe ends and spanning the space therebetween, dropping the top segmental member 24 down into position between the ears 11 and 12 and inserting the key 38 into position in the slots 13 and 14, and if necessary, driving the key 38 into position by means of a hammer, block of wood, or it can be driven in sufficiently firm by means of a kick directed against the end of the key 38 with a heavy shoe which puts sufficient pressure upon the two segmental members to cause the sealing members to firmly adjust themselves around the outer surface of the adjacent ends of the pipe. Because of the shape of the arcuate channels in the upper and lower members the initial pressure is exerted centrally on the sealing members and in effect the sealing member, which is preferably made of rubber or some flexible composition assumes a tight sealing relation with respect to the coupling members and around the ends of the pipe, thus effectively providing a quick and effective means of coupling the pipes together.

While I have described more or less precisely the details of construction, I do not wish to be understood as limiting myself thereto, as I contemplate changes in form and the proportion of parts and the substitution of equivalents as circumstances may suggest or render expedient without departing from the spirit and scope of my invention.

I claim:

1. In a pipe coupling the combination of co-operating clamping sections interfitted with each other, sealing members secured to each of said clamping sections, one of said clamping sections having ears with openings therein, between which ears the other clamping member extends, a key adapted to extend through the openings in the said ears, and a flexible member secured to one of the clamping sections and movably connected with the other clamping section and the key.

2. In a pipe coupling the combination of co-operating clamping sections interfitted with each other, sealing members secured to each of said clamping sections, one of said clamping sections having ears with openings therein, between which ears the other clamping member extends, a key adapted to extend through the openings in the said ears, and a flexible member secured at one of its ends to one of the clamping sections and extending loosely through openings in the other clamping section and the key member.

3. In a pipe coupling the combination of co-operating clamping sections interfitted with each other, sealing members secured to each of said clamping sections, one of said clamping sections having ears with openings therein, between which ears the other clamping member extends, a key adapted to extend through the openings in the said ears, and a flexible member secured at one of its ends to one of the clamping sections and extending loosely through openings in the other clamping section and the key member, and a hand hold member secured to the free end of said flexible member whereby the clamping section through the flexible member extends and the key members are held in loose position on the said flexible member.

4. In a pipe coupling the combination of two co-operating clamping sections interfitted with each other, sealing members secured to each of said clamping sections, one of said sections having ears with openings therein, a key fitted into the openings having an opening in one end thereof and spanning the space between the said ears, an eyelet in one of said clamping sections, a flexible member secured to the other clamping section and threaded through the eyelet on the other section and through the opening in the end of the key member, and a hand piece on the free end of said flexible member.

5. In a pipe coupling the combination of co-operating segmental clamping members interfitted with each other, one of said clamping members having ears thereon with openings therein, a key adapted to span the space between the ears on one of said clamping members, sealing members mounted in each of said clamping members, each sealing member consisting of spaced arcuate portions connected by a flange at each of their ends and a web portion connecting the arcuate shaped portions intermediate their ends, and a fastening member securing the said web portion to the clamping member.

6. In a pipe coupling the combination of co-operating segmental clamping members interfitted with each other, one of said clamping members having ears thereon with openings therein, a key adapted to span the space between the ears on one of said clamping members, sealing members mounted in each of said clamping members, each sealing member consisting of spaced arcuate portions connected by a flange at each of their ends and a web portion connecting the arcuate shaped portions intermediate their ends, and a fastening member securing the said web portions at their centers to the clamping member.

7. In a pipe coupling the combination of co-operating segmental clamping members interfitted with each other, one of said clamping members having ears thereon with openings therein, a key adapted to span the space between the ears on one of said clamping members, sealing members mounted in each of said clamping members, each sealing member consisting of spaced arcuate portions connected by a flange at each of their ends and a web portion connecting the arcuate shaped portions intermediate their ends, and a stud extending through the web portion of the sealing member and through the adjacent clamping member, whereby the said sealing members are secured to the clamping members at one point only.

WILLIAM S. DRINKWATER.

REFERENCES CITED

The following references are of record in the file of this patent:

UNITED STATES PATENTS

| Number | Name | Date |
| --- | --- | --- |
| 2,377,510 | Newell | June 5, 1945 |
| 1,628,132 | Farnstrom | May 10, 1927 |
| 1,641,839 | Cain | Sept. 6, 1927 |
| 1,590,908 | Riles | June 29, 1926 |
| 2,036,320 | Connelly | Apr. 7, 1936 |